(12) United States Patent
Lee

(10) Patent No.: US 6,450,551 B1
(45) Date of Patent: Sep. 17, 2002

(54) NONFERROUS METAL PIPE COUPLING STRUCTURE

(76) Inventor: Do Yean Lee, 1158-20, Cheki 2 Dong Tongduemoon-Ku, Seoul (KR)

( * ) Notice: Subject to any disclaimer, the term of this patent is extended or adjusted under 35 U.S.C. 154(b) by 0 days.

(21) Appl. No.: 09/644,127

(22) Filed: Aug. 23, 2000

(30) Foreign Application Priority Data

Apr. 20, 2000 (JP) ........................................ 2000-119804

(51) Int. Cl.[7] ................................................ F16L 27/00
(52) U.S. Cl. ........................... 285/373; 285/55; 285/419
(58) Field of Search ............................ 285/55, 419, 373

(56) References Cited

U.S. PATENT DOCUMENTS

| | | | | |
|---|---|---|---|---|
| 4,421,347 A | * | 12/1983 | Kantor | 285/373 |
| 4,557,509 A | * | 12/1985 | Giebeler | 285/373 |
| 4,768,813 A | * | 9/1988 | Timmons | 285/373 |
| 5,004,275 A | * | 4/1991 | Miller | 285/373 |
| 5,215,337 A | * | 6/1993 | Spirkowye et al. | 285/373 |
| 5,605,357 A | * | 2/1997 | Bird | 285/373 |
| 5,769,467 A | * | 6/1998 | Bridges | 285/373 |
| 5,911,446 A | * | 6/1999 | McLennan et al. | 285/373 |
| 6,131,957 A | * | 10/2000 | Saito et al. | 285/373 |
| 6,161,878 A | * | 12/2000 | Atsumi et al. | 285/373 |

* cited by examiner

Primary Examiner—Eric K. Nicholson
(74) Attorney, Agent, or Firm—Klauber & Jackson

(57) ABSTRACT

The invention is to provide a coupling structure of corrosion resistance for nonferrous metal piping.

The coupling structure comprises: iron socket members(10, 10a), for a two piece iron socket, each being in the shape of a divided half piece of the socket and having a first groove and a second groove at each end part of the socket; a separator dually layered of a synthetic resin layer and a nonferrous metal layer to fit in the first groove(11) and having a lengthwise groove on the inner face; a cylindrical packing(3) having a sealing ring(3a) at each end for fitting in the second groove(12) and arranged to cover the inner surface of the socket members(10, 10a); and nonferrous metal pipes(1, 1a) each having at the end a stopper ring(20 or lugs(2a) round the periphery to fit in the first groove(11), to be assembled into an integral assembly in the manner that the ends of the nonferrous metal pipes(1, 1a) are fitted in the respective sealing rings(3a) for the stopper ring(2) or lugs(2a) to be fitted in the groove of the nonferrous metal layer of the separator to be covered with both the socket members and tightened with bolts nuts for finishing.

6 Claims, 3 Drawing Sheets

NONFERROUS METAL PIPE COUPLING STRUCTURE

FIELD OF THE INVENTION

The present invention relates to an improvement of coupling structure for pipes of one of nonferrous metals including copper, stainless steel, aluminum, etc. to couple them to one another.

DESCRIPTION OF THE ART

Generally, pipes of stainless steel, aluminum or another nonferrous metal are connected to one another with iron couplings(or connection structures), but the structure of the coupling has a fault that causes electrochemical corrosion of the pipes due to the contact between two different metals such as iron and a nonferrous metal.

Thus, to prevent the fault, couplings have come to be made of bronze or brass.

As stated above, the coupling of bronze or brass is certain to bring the anticorrosive nature to it, but the production cost makes it expensive for use and presents a fundamental fault.

Also, anticorrosive construction was proposed for a coupling to have a nonferrous metal, such as stainless steel, layer on the inner marginal edge of the iron coupling arranged to be in contact with the nonferrous metal pipe. However, this coupling is arranged to have the nonferrous metal layer directly in contact with the inner marginal edge of the iron coupling, such that, in the same way as stated before, electrochemical corrosion occurs in the nonferrous metal layer in contact with the iron coupling to subsequently corrode the nonferrous metal pipe in contact with the corroding nonferrous layer to a disadvantage.

SUMMARY OF THE INVENTION

The present invention is designed to provided an inexpensive but anticorrosive coupling structure for nonferrous metal piping, and its structure is constructed as follows.

1. A feature is that its structure comprises:
    a two piece set of dually grooved iron socket component members having a first semicircular groove and a second semicircular groove both formed in the inner marginal wall face, the component members having the half shape of the socket component from division into halves of the socket along the axis of piping;
    a separator unit, dually layered of a synthetic resin layer and a nonferrous metal layer, to fit in the first groove and itself also having a lengthwise groove;
    a cylindrical packing formed to have at the ends sealing rings for fitting in the second grooves and to cover the inner surface of the two iron socket members in opposition; and
    nonferrous metal pipes provided on the outer marginal edge with a stopper ring or lugs fitting into the first groove formed in the iron socket members, to be put together and tightened with bolts and nuts into an integral assembly in a manner that the nonferrous metal pipe ends are fitted in the sealing ring of the packing and the stopper ring or lugs on the pipes are fitted in the groove of the nonferrous metal layer of the separator.
2. Another feature is that the first semicircular grooves formed in the inner end walls of the two iron socket members receive the separator members of a resin layer and a nonferrous metal layer having at least a part of "⊐" form or a similar form in section.
3. Still another feature is that the two iron socket members are formed into a "T" form pipe couple. A further feature is that the iron socket component connects with the non ferrous metal pipe in a way of not being in contact directly with each other.

To achieve the above features, the iron socket component is cut along the piping axis into halves whose inner faces are arranged to fittingly receive in their second grooves the sealing rings(3a) of the packing(3) and also receive in their first groove, positioned outer than the second groove, the separator of a resin layer and a nonferrous metal layer to couple through the separator placed in-between with a nonferrous pipe, such that, despite the fact that a nonferrous metal pipe is connected to an iron socket component without a direct contact between them, a good sealing state is still kept for coupling with pipes not to slip off for separation.

Thus, the iron socket component unit and the nonferrous metal pipe are not to be in contact with each other in connection so that the electrochemical corrosion to occur in the conventional coupling is not to happen in the coupling of the invention.

Numerals indicate the following members:

1, 1a nonferrous metal pipes; 2 stopper ring, 2a lugs; 3 cylindrical packing, 3a sealing ring; 10, 10a iron socket members; 11, 11a first semicircular groove; 12, 12a second semicircular groove; 13, 13a fastening members; 14 nonferrous metal layer, 15 synthetic resin layer.

DESCRIPTION OF THE PREFERRED EMBODIMENT

In reference to the drawings, an embodiment of the invention shall be described in the following.

A coupling structure(or a connection structure) for coupling nonferrous metal pipes has iron socket component members(10, 10a) being half members from division of the socket along the axial line of piping, the socket members(10, 10)each having first grooves(11, 11a) at the inner ends of the socket members(12, 12a)and second grooves(12, 12a) each formed in parallel to the first groove and positioned inner than the first groove to receive a sealing ring(3a) of the later description.

Further, a separator is provided of a dual layer structure consisting of a synthetic resin layer(15), having a sectional face in the shape including a part of "⊐" form or "C" form like an "Ω" form or a pot cap in section to conform with the sectional face of the first groove, and a nonferrous metal layer(14) having a face matching with the inner face of the resin layer(15).

The separator may consist of a member prefabricated to conform with the semicircular inner face of the iron socket members(10, 10a) to be fitted in the first groove(11, 11a) in later assembling or of a member having a synthetic layer(15) adhesively fixed to the groove(11, 11a). The resin layer(15) for the separator is to separate and insulate the nonferrous metal pipe from the iron socket members(10, 10a) and may be made of industrial use resin selected from vinyl chloride, nylon, fluorinated resin, ABS and others. Further, the nonferrous metal layer(14) is made preferably of the same kind of metal as that of the nonferrous metal pipe(1, 1a), but it may be of another nonferrous metal that will not cause electrochemical corrosion.

Still further, the iron socket members(10, 10a) are arranged to have on their inner side a cylindrical packing(3), where outer surface conforms with the inner surface of the socket members(10, 10a) and Which has a sealing ring(3a) of "C" form at each end and is shaped in the form of an elbow, a "T" form, a cross or a "Y" form. The packing(3) fits in the inner surface of the iron socket members(10, 10a) for the sealing ring(3a) to fit in the second semicircular grooves (12, 12a) of the socket members and enables to couple nonferrous metal pipes and also protect the inner faces of the socket members(10, 10a).

Besides, the packing(3) is made of a material having chemical and physical resistance to the fluid flowing through the nonferrous pipes(1, 1a), the material being selected mainly from vinyl chloride, fluorinated resin, ABS etc.

Figure 1:
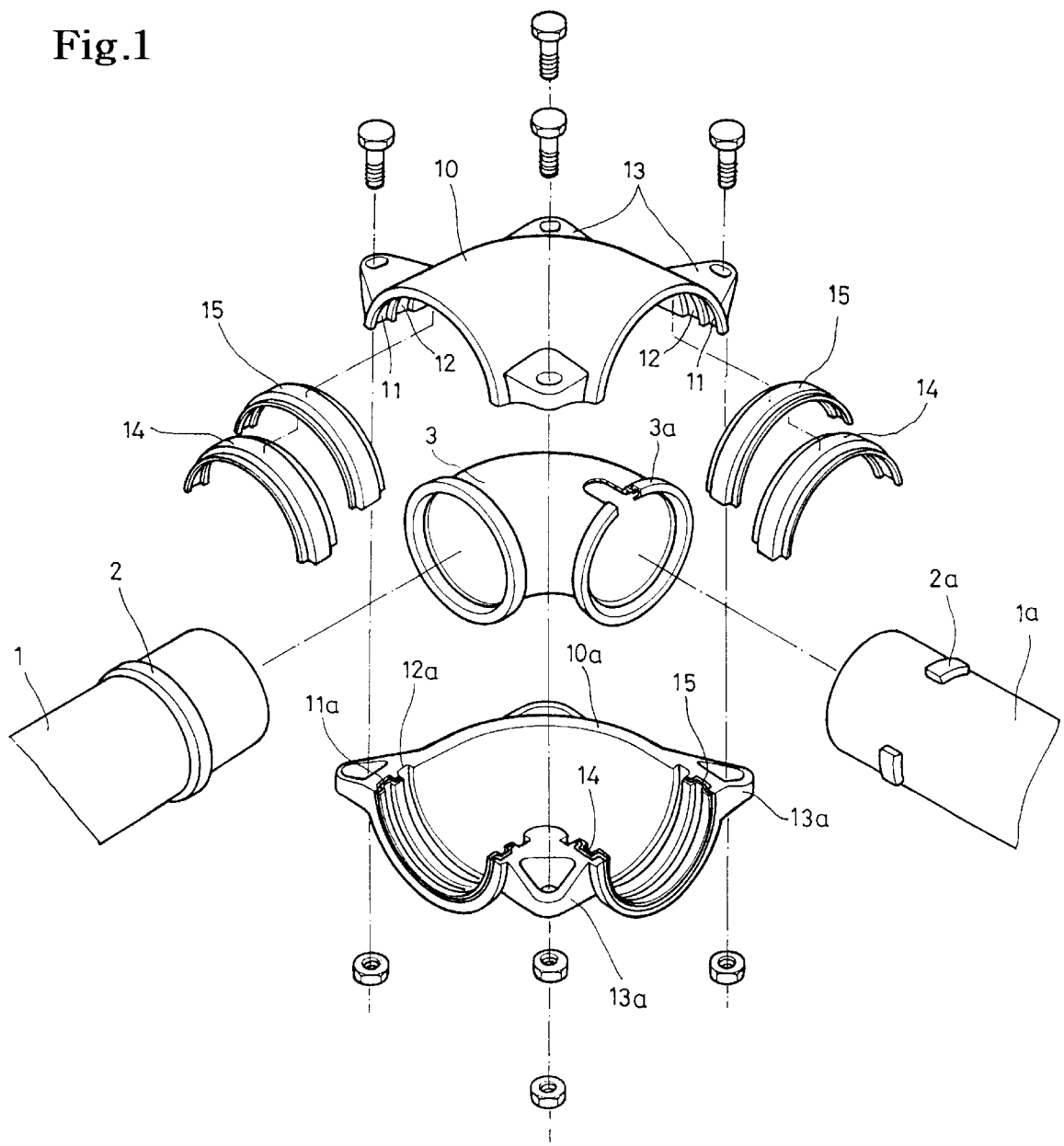
FIG. 1 shows a perspective view of the disassembled members of pipe coupling structure for nonferrous metal pipes.

On the other hand, the connecting end portion of a nonferrous metal pipe(1 or 1a) is provided with a stopper ring(2) or lugs, as shown in FIG. 1.

Figure 2:
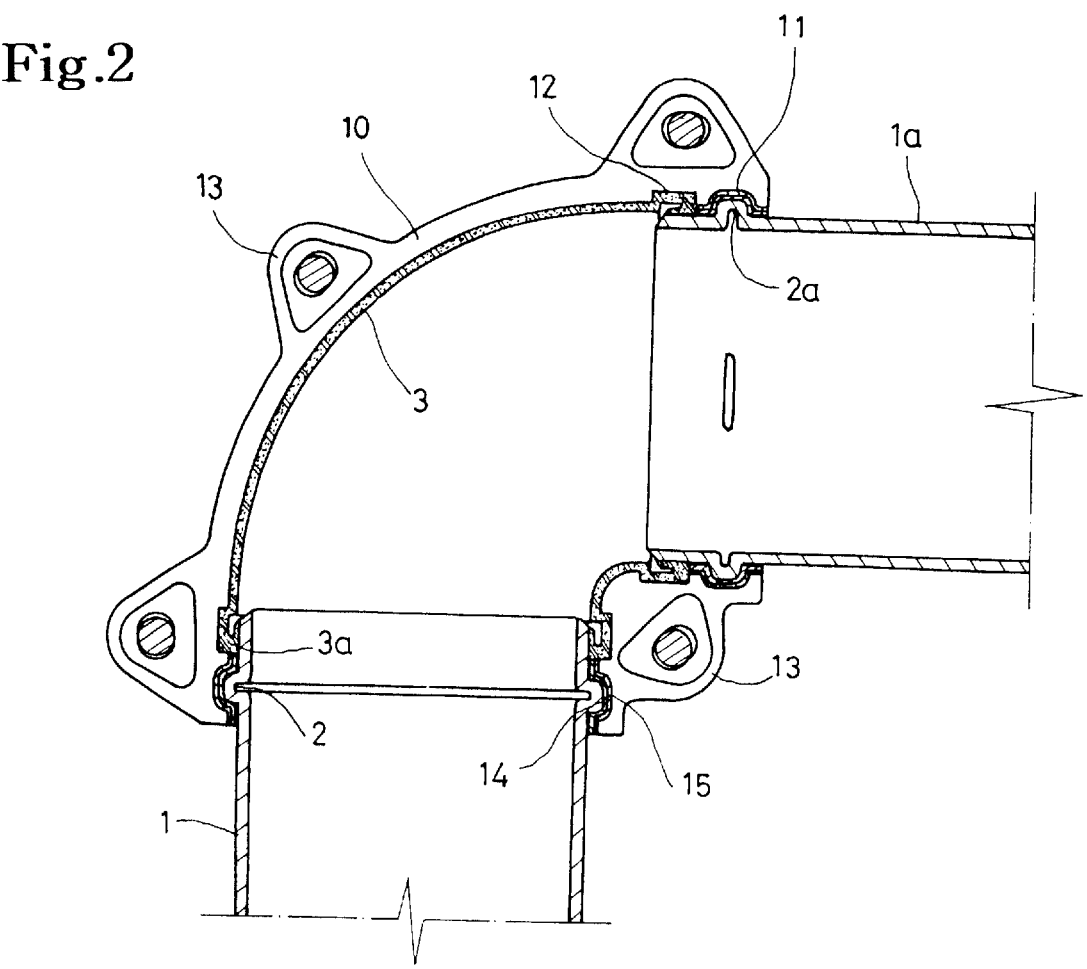
FIG. 2 shows a sectional view of the assembled state of coupling.
Figure 3:
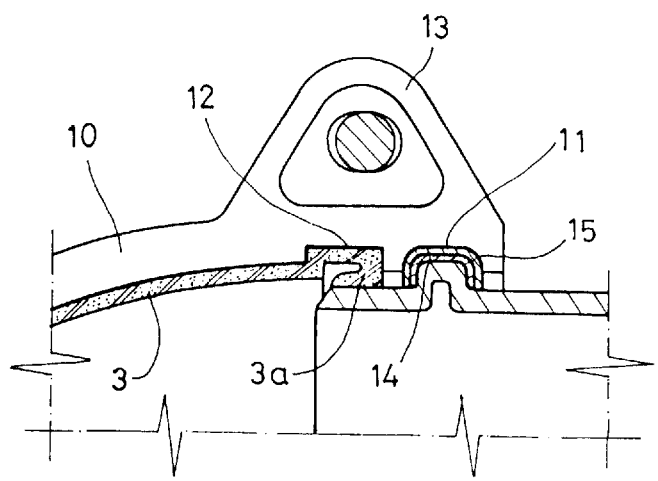
FIG. 3 shows an expanded sectional view of a connection part having a separator of a dual layer structure consisting of a synthetic layer and a nonferrous metal layer placed in the first groove.

Next, when to couple the nonferrous metal pipes(1, 1a) the cylindrical packing(3) with both ends receives the respective pipes(1, 1a) in fitting, the sealing rings(3a) each are fitted in the second groove(12, 12a) of the socket members(10, 10a) as shown in FIGS. 2 and 3 and the stopper rings(2) or lugs(3a) at the ends of nonferrous metal pipes(1, 1a) are fitted in hooking into the first groove(11, 11a) with the separator placed between the socket and rings(2) or lugs(2a).

The separator may be fitted in the first grooves(11, 11a) prior to the assembling of iron socket members(10, 10a) or positioned round the end of the nonferrous metal pipes(1, 1a) for later assembling. Also, the separator may be prefixed in the first grooves(11, 11a) of the iron socket members(10, 10a) to be simply combined with a unit combination of the connecting pipes(1, 1a) and the packing(3) for the socket members(10, 10a) to cover the assembly for finishing.

The iron socket half members(10, 10a) formed in a divided half shape of the socket have fastening protrusion members arranged to be positioned at the tips and corners to be in opposition to each other of matching pairs to be fastened with bolts and nuts for combination assembly.

As stated before, the iron socket members(10, 10a) placed in middle of two nonferrous metal pipes(1, 1a) for their coupling are provided with a separator of a dual layer structure of a synthetic layer(15) having an "Ω" form section and a nonferrous metal layer(14) placed in the first semicircular grooves(11, 11a) formed at the socket member ends, and the nonferrous metal pipes(1, 1a) are provided at their ends each with a stopper ring(2) of lugs(2a) formed to fit in the first grooves, in the manner of being in contact with the nonferrous metal layer(14), to stop slipping-off of the pipes (1, 1a). Further, the end portions of the nonferrous metal pipes(1, 1a) are arranged to be forced into the sealing ring(3a) of the packing(3) to be tight sealed by the tensility of the sealing ring(3a).

Figure 4:
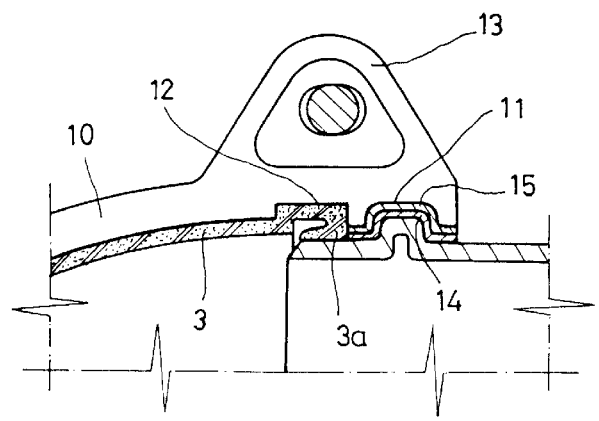
FIG. 4 shows an expanded sectional view of a coupling with separator having another form of section.
Figure 5:
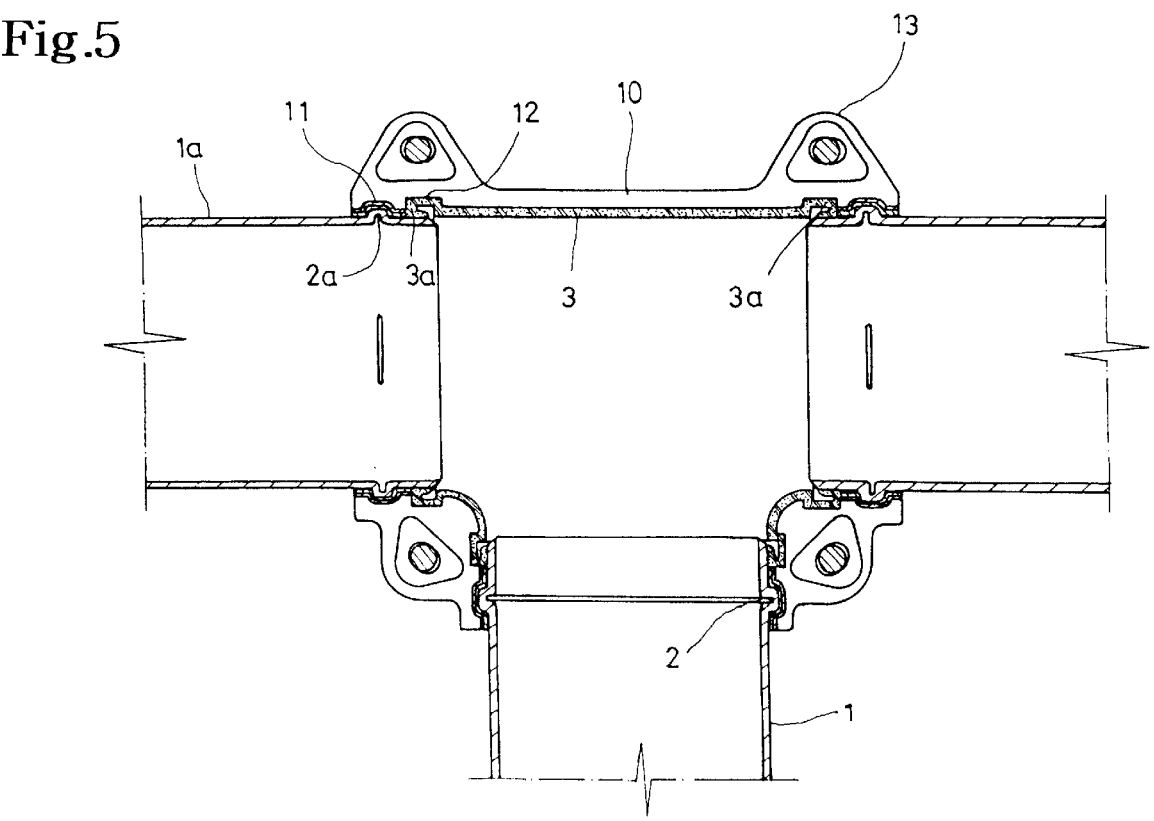
FIG. 5 shows a sectional view of a nonferrous metal pipe coupling structure formed into a "T" form socket shape.

FIG. 3 shows a separator of a dual layer structure of a synthetic resin layer(15) and a nonferrous layer(140 in the sectional shape of "Ω" form having at least a "⊐" or "C" form part and having extensions on both sides of the shape. And FIG. 4 shows a separator consisting of a synthetic resin layer(15) and a nonferrous metal layer(14) and being in the shape of "⊐" or "C" form in section. The dually layed structure of the separator may employ any shape for its sectional face. But an essential matter is that the coupling of the nonferrous metal pipes should have a structure in that a synthetic resin layer(15) is placed between the nonferrous metal pipes(1, 1a) and the iron socket members(10, 10a) so as not to contact each other for the socket members(10, 10a) to wrappingly cover the coupling.

Also, when assembled, the iron socket component of the members(10, 10a) can take a shape selected from "┳", "+", "└", "V" or "C" form. Since the invention is constructed as stated above, when the nonferrous metal pipes(1, 1a) are coupled with each other in the manner of being clamped with the iron socket members(10, 10a), the members are to receive a separator of a resin layer(15) and a nonferrous metal layer(14) in the first grooves(11, 11a) at respective ends so as to insulate the iron socket members(10, 10a) from the nonferrous metal pipes(1, 1a) with the resin layer(15).

And although the inner socket members(10, 10a) are inexpensive for use in cost, they still effectively prevents the electrochemical corrosion of the coupling according to the invention to a good advantage.

Also, the iron socket members(10, 10a) are provided on their inner side with packing(3) in the form of lamination to pass fluids through the packing but keep the fluids from contacting the iron members directly.

Further, the nonferrous metal pipes(1, 1a) each are provided with a stopper ring(2) or lugs(2a) on respective tips, when coupling, to be fitted in the groove of the separator to couple with the iron socket members(10, 10a) to the effect of good mechanical coupling.

Still further, the cylindrical packing(3) is provided with sealing rings(3, 3a) for producing tensile force for the nonferrous metal pipes(1, 1a) to tightly fit in for leak-proof coupling of the pipes(1, 1a) with the packing(3).

As described above, with the use of the nonferrous metal pipe coupling structure of the invention, the inexpensive iron socket(10, 10a) can fully prevent the corrosion of the coupling part and make it easy to assemble and disassemble the coupling to obtain a solid structure of coupling.

What is claimed is:

1. A ferrous pipe coupling structure for coupling nonferrous metal pipes, said coupling structure comprising:

a two piece iron socket component comprising two half members being divided along a horizontal axis, wherein each of the two half members having a first semicircular groove and a second semicircular groove;

a separator component dually layered of a synthetic resin layer and a nonferrous metal layer, said separator component being fitted in the first groove of the two half members, and said nonferrous metal layer having a third semicircular groove formed along an inner surface;

a cylindrical packing having two ends, and sealing rings at each of the two ends, said sealing rings being fitted into the second groove of the two half members and covering an inner surface of the two half members in opposition to the packing; and nonferrous metal pipes arranged at each of the two ends of the cylindrical packing, a stopper ring or lugs arranged on a periphery of the pipes so as to fit in the first groove of the iron socket component with said nonferrous metal layer of the separator disposed between the first groove and the stopper ring or lugs; and fasteners to join the two half members of the iron socket component together after arrangement of the pipes.

2. a pipe coupling structure as defined in claim 1, in which the first semicircular groove formed in the inner wall of the iron socket component receives said separator so that said synthetic resin layer is in contact with the inner wall of the iron socket component and said synthetic resin layer and the nonferrous metal layer of the separator form a groove of "⊐" shape.

3. a nonferrous metal pipe coupling structure as defined in claim 1, wherein two iron socket component members are shaped in a "T" form.

4. A ferrous pipe coupling structure for coupling nonferrous metal pipes, said coupling structure comprising:

a two piece iron socket component comprising two half members being divided along a horizontal axis, wherein each of the two half members having a first semicircular groove and a second semicircular groove;

a separator component dually layered of a synthetic resin layer and a nonferrous metal layer, said separator component being fitted in the first groove of the two half members, and said nonferrous metal layer having a third semicircular groove formed along an inner surface;

a cylindrical packing having two ends, and sealing rings at each of the two ends, said sealing rings being fitted into the second groove of the two half members and covering an inner surface of the two half members in opposition to the packing; and stopper rings or lugs that are arranged on the inner surface of the nonferrous metal layer of the separator for retaining a nonferrous metal pipe in each of the two ends of the cylindrical packing; and fastening means to join the two piece iron socket component together.

5. A pipe coupling structure as defined in claim 1, in which the first semicircular groove formed in the inner wall of the iron socket component receives said separator so that said synthetic resin layer is in contact with the inner wall of the iron socket component and said synthetic resin layer and the nonferrous metal layer of the separator form a groove of "⊐" shape.

6. A nonferrous metal pipe coupling structure as defined in claim 4, wherein two iron socket component members are shaped in a "T" form.

\* \* \* \* \*